United States Patent [19]

Buckland et al.

[11] Patent Number: 4,838,690

[45] Date of Patent: Jun. 13, 1989

[54] SIMULTANEOUS BI-DIRECTIONAL OPTICAL TIME DOMAIN REFLECTOMETRY METHOD

[75] Inventors: Eric L. Buckland, Raleigh; Masayuki Nishimura, Durham, both of N.C.

[73] Assignee: Sumitomo Electric Fiber Optics Corporation, Research Triangle Park, N.C.

[21] Appl. No.: 180,545

[22] Filed: Apr. 12, 1988

[51] Int. Cl.$^4$ ...................... G01N 21/84; G01N 21/88
[52] U.S. Cl. .................................................. 356/73.1
[58] Field of Search ........................................ 356/73.1

[56] References Cited

FOREIGN PATENT DOCUMENTS 58-100733  6/1983  Japan .................................. 356/73.1

OTHER PUBLICATIONS

Publication by Fermann et al., entitled "Comparative Measurement of Rayleigh Scattering in Single-Mode Optical Fibers Based on an OTDR Technique", Apr. 1988, Journal of Lightwave Technology, vol. 6, No. 4, pp. 545–551.
Publication by Fermann et al., entitled "A New Technique for the Relative Measurement of Scatter Levels in Single Mode Fibres".
Publication by Gold et al., entitled "Long-Range Single-Mode OTDR: Ultimate Performance and Potential Uses".
Publication by Philen et al., "Single-Mode Fiber OTDR: Experiment and Theory", IEEE Transactions on Microwave Theory and Techniques, vol. MTT-30, No. 10, Oct. 1982.
Publication by Hartog et al., entitled "On the Theory of Backscattering in Single-Mode Optical Fibers", Journal of Lightwave Technology, vol. LT-2, No. 2, Apr. 1984, pp. 76–82.

Primary Examiner—Vincent P. McGraw
Attorney, Agent, or Firm—Richard E. Jenkins

[57] ABSTRACT

A simultaneous bi-directional OTDR optical fiber measurement method wherein a test fiber is spliced between a launch fiber and a termination fiber which is provided with a reflective coating at its terminal end. A laser light pulse is introduced into the launch fiber and the forward trace signal and reverse trace signal from the light pulse are detected. A correction is applied to the reverse trace signal to account for reflectivity originating at the fiber input end so that an accurate measurement can be made of certain fiber characteristics of a single-mode optical fiber.

27 Claims, 4 Drawing Sheets

SIMULTANEOUS BI-DIRECTIONAL OPTICAL TIME DOMAIN REFLECTOMETRY METHOD

1. Technical Field

The present invention relates to optical time domain reflectometry (OTDR) testing of optical fibers, and more particularly to an optical time domain reflectometry testing method which provides for accurately performing simultaneous bi-directional optical time domain reflectometry testing measurements.

2. Background Art

Optical time domain reflectometry (OTDR) testing is a proven non-destructive technique for determining the existence and location of fiber breaks and for measuring both splice and transmission loss in an installed fiber system. OTDR is an optical pulse echo system which utilizes an optical probe pulse from a laser which is introduced into the optical fiber to be tested. The probe pulse undergoes scattering continuously along the length of the fiber so as to produce a low-level reflected signal. The degree of scattering is dependent on the amount of transmission loss in the fiber and is primarily caused by Rayleigh scattering from inhomogeneities in the glass. The reflected signals propagate back to the input end of the fiber where they are detected by a photodetector, displayed on a sampling oscilloscope, and analyzed by a computer.

In the past, it was necessary to take a measurement in each direction through a fiber and then average the measurements for accurate analysis since varying fiber parameters result in bi-directionality of the trace in OTDR testing. Although the use of a mirrored surface on one end of a test fiber in order to allow simultaneous two-way OTDR testing of an optical fiber has been previously proposed, there has to date been no practical and technically viable system to accurately perform simultaneous bi-directional OTDR measurements. This is apparently due to the fact that a "noise" contribution due to previously unrecognized reflectivity at the interface of the launch fiber and the OTDR testing apparatus can significantly affect the reverse trace signal and resulting fiber measurements. The present invention has recognized this previously unappreciated phenomenon and provides for a practical and accurate method for performing simultaneous bi-directional optical time domain reflectometry (OTDR) measurements which includes a correction algorithm for removing the superfluous reflectivity signal from the reverse trace of the laser pulse signal.

DISCLOSURE OF THE INVENTION

In accordance with the present invention, applicant provides an improved optical time domain reflectometry (OTDR) method for testing optical fibers which provides for accurate simultaneous bi-directional measurement utilizing a correction algorithm for the reverse trace signal which removes unwanted signal contributions resulting from reflectivity at the interface of the OTDR testing apparatus and the launch fiber.

The simultaneous bi-directional OTDR testing method for measuring certain characteristics of single mode and multi-mode optical fibers includes splicing a test fiber between a launch fiber which is connected to an OTDR testing apparatus and a termination fiber which has a highly reflective coating at its terminal end. A light pulse is then introduced by a laser into the launch fiber by means of conventional OTDR testing apparatus. An optical detector is utilized to detect the forward trace signal (T1) and the reverse trace signal (T2) generated by the light pulse. In order to facilitate accurate testing measurement of the optical fiber, the reverse trace signal (T2) from the light pulse is corrected with an algorithm in order to remove reflected signals originating at the interface of the OTDR testing apparatus and the launch fiber connected thereto, and the forward trace signal (T1) and the corrected reverse trace signal (T2) are then analyzed to accurately measure certain desired characteristics of the test fiber.

Accordingly, it is a general object of the present invention to provide an improved method of OTDR testing.

More specifically, it is an object of the present invention to provide a practical and accurate simultaneous bi-directional OTDR testing method.

Still another object of the present invention is to provide a method for correcting the reverse trace signal T2 in simultaneous bi-directional OTDR testing in order to provide for accurate optical fiber measurements.

DESCRIPTION OF THE DRAWINGS

Some of the objects of the invention having been stated, other objects will become evident as the description proceeds, when taken in connection with the accompanying drawings in which.

BEST MODE FOR CARRYING OUT THE INVENTION

Figure 1:
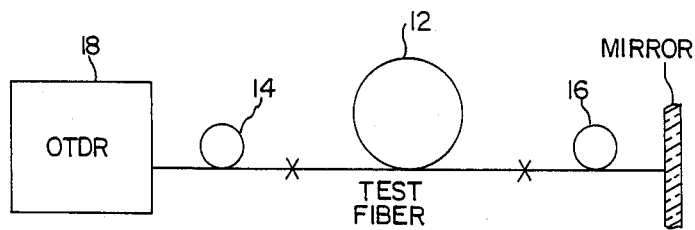
FIGS. 1 and 1A are a schematic view of an OTDR testing apparatus in accordance with the present invention.
Figure 1A:
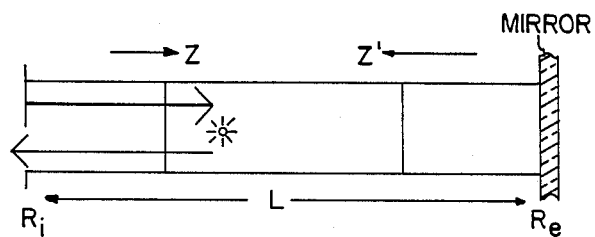

With particular reference to FIG. 1 of the drawings, a system for performing the simultaneous bidirectional OTDR measurement is shown. A test fiber 12 is spliced between a launch fiber 14 and a termination fiber 16. Termination fiber 16 is connected to a connectored fiber having a thin layer of gold sputtered onto the end thereof. The reflectivity (Re) from the gold sputtered end of termination fiber 16 is greater than 90% with only some degradation due to a splice between the connectored fiber and termination fiber 16. Since test fiber 12 is spliced between launch fiber 14 and termination fiber 16, termination fiber 16 and the connectored fiber are a permanent part of the entire measurement system and the reflectivity Re is constant for all measurements.

The lengths of the launch fiber 14 and the termination fiber 16 are chosen to sufficiently suppress the effects of input and reflected pulse saturation on the test link and to provide a sufficient number of data for accurate linear regression on these portions of the pulse trace, and are each most suitably greater than 200 meters in length. Although there is no absolute need to match the performance characteristics of launch fiber 14 and termination fiber 16 when the ratio of reflectivity at input (Ri) and reflectivity at the reflecting end of the termination fiber (Re) is small, careful selection of the launch and termination fibers (as described hereinafter) minimizes the error in the correction of the reverse trace as provided by the method of the present invention. For measuring the back-scattered light or signal from the forward and reverse traces, a commercially available OTDR testing apparatus 18 is provided which utilizes a single-mode dual wave length source module with a masking function to further minimize effects of detector saturation from the reflected pulse.

THEORY OF THE OTDR METHOD

Figure 2:
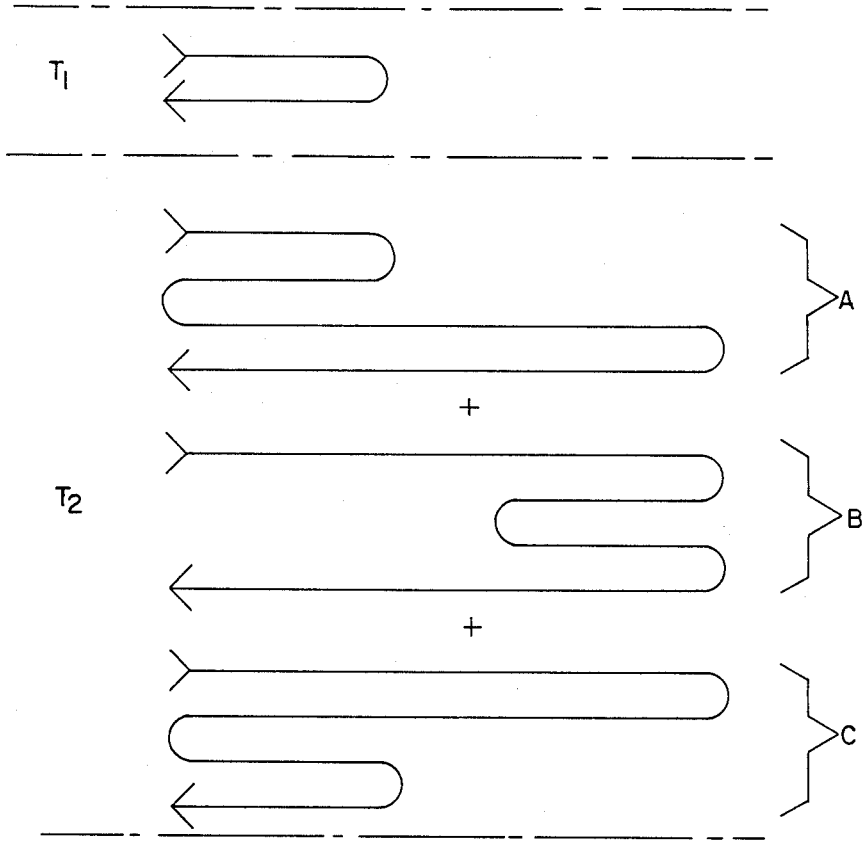
FIG. 2 is a schematic representation of the signal elements present in the forward trace (T1) and the reverse trace (T2) resulting from introduction of a light pulse into the launch fiber of the system.

The theory of optical fiber back-scatter as measured by the method of the invention will now be set forth with particular reference to FIG. 2 of the drawings. The signal P(t) detected by OTDR testing apparatus 18 is dependent on the proportion of total attenuation scattered and confined in the counter propagating mode, as shown in Equation 1 below:

$$P(t) = EO * Vg * e^{-2\alpha_t z} * B(z) \quad (Equation\ 1)$$

In the foregoing Equation 1, EO is input power, Vg is group velocity, $\alpha_t$ is total contribution to attenuation, variable z is the distance to the scattering point measured from the signal input end of the link arriving at time $t = 2*z/Vg$. B(z), the source of OTDR bidirectionality, is the local scattering factor dependent on the Rayleigh scattering portion of attenuation and a fiber parameter dependent containment factor.

With simultaneous bi-directional OTDR methodology, Equation 1 is valid only for the initial forward trace (T1 of FIG. 2) represented by the equation $t < = 2*L/Vg$, where L is the total fiber length. For t22 $2*L/Vg$, the trace is a superposition of all independent signals which arrive back at the optical detector of OTDR testing apparatus 18 at the same time t. FIG. 2 illustrates the possible signal paths for the initial forward trace (T1) and the next trace or reverse trace (T2) where $2*L/Vg < t < 4*L/Vg$. The primary signal B of reverse trace T2 is due to scattering at a point Z' as measured from the remote end of termination fiber 16. Also, at the same time t, two equivalent signals A and C are returned from point z wherein the sum of the two signals is an attenuated reproduction of forward trace T1 arising from the non-zero reflectivity Ri at the input of launch fiber 14. The reflectivity Ri is due to reflectivity between the interface of launch fiber 14 and OTDR testing apparatus 18 and may also include reflected signals from internal optics of OTDR testing apparatus 18. In order to accurately measure reverse trace T2, the contaminating signal due to reflectivity Ri at the input must be subtracted from measured trace T2.

Figure 3:
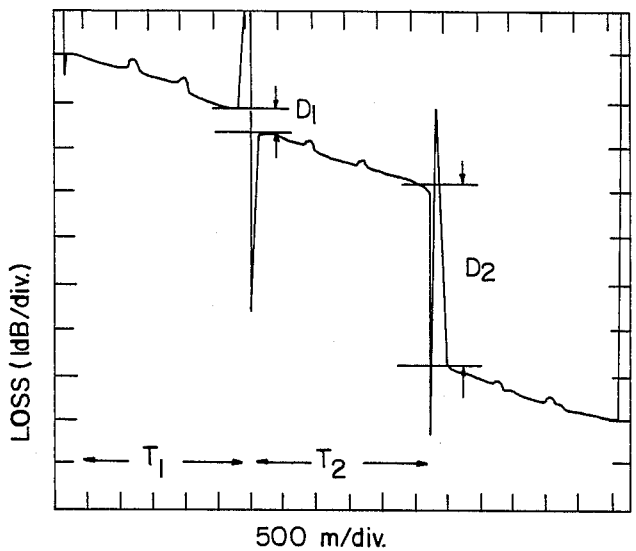
FIG. 3 illustrates a sample trace (T2) before correction.
Figure 4:
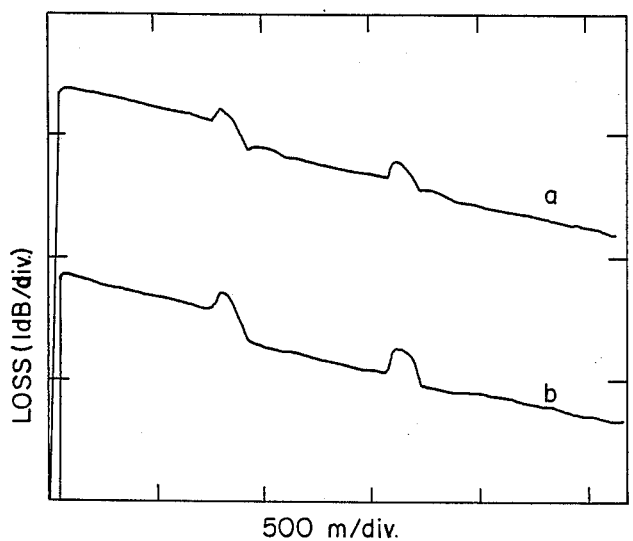
FIG. 4 illustrates the center of the trace (T2) both before, and after application of the correction.

The desired reverse trace T2 is obtained by first transforming the logarithmic data (see Equations below), then subtracting the appropriate fraction of the forward trace from the acquired trace of t22 $2*L/Vg$. FIG. 3 shows a sample trace through $t = 6*L/Vg$, before correction. The correction algorithm requires comparing the return losses D1 and D2 as shown. FIG. 4 shows the center of the trace T2 before and after application of the correction routine.

Averaged bi-directional traces can be used to accurately calculate attenuation and splice loss in an optical fiber.

Test Results

To verify the accuracy of the simultaneous bidirectional OTDR method, 12 cabled depressed cladding single-mode fibers were measured using the described system. The splices to launch fiber 14 and termination fiber 16, also depressed cladding fibers, were mechanical V-groove splices with index matching liquid having varying splice quality. Attenuation measurements from the average of the bi-directional traces were compared with standard cut-back method attenuations at 1.3um and 1.5um both before and after correction according to the present method. The results are shown in Table 1 below and clearly demonstrate that recognition of the input reflectivity Ri allows for significant improvement of attenuation measurements.

TABLE 1

|  | 1.3 um | | 1.55 um | |
| --- | --- | --- | --- | --- |
|  | $\bar{x}$ | $\sigma$ | $\bar{x}$ | $\sigma$ |
| Uncorrected trace | .036 | .032 | .031 | .036 |
| Corrected trace | −.008 | .015 | .011 | .017 |

Attenuation error: OTDR - cutback (dB/km)

Figure 5:
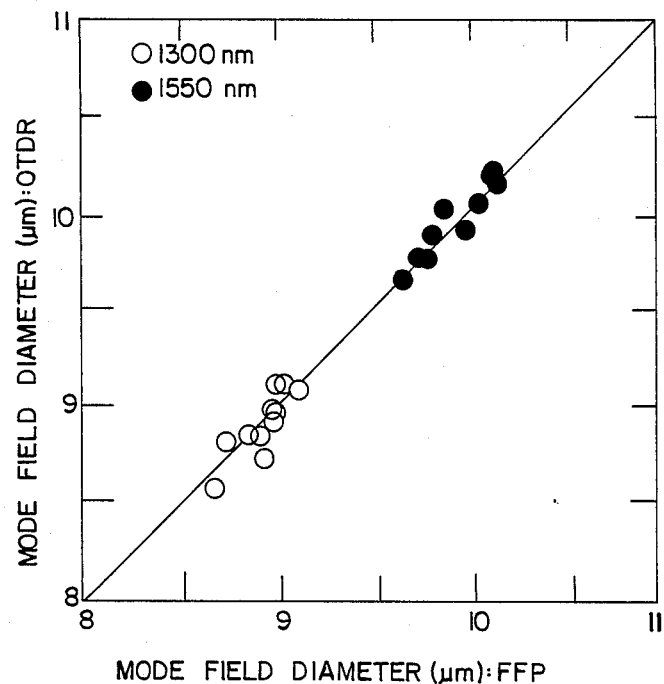
FIG. 5 illustrates the agreement achievable between standard FFP measurement methodology and the simultaneous bi-directional OTDR method of the invention.

Also of interest, to test the feasibility of using the method of the present invention to estimate mode field diameters (MFD) of single mode fibers, the splice losses due to splicing of the test fiber to the launch and termination fiber were measured using the simultaneous bi-directional OTDR method in the forward and reverse directions. With the MFD of the two splices measured by the far-field pattern (FFP) method, the MFD at each end of the test fibers were calculated from the splice losses. FIG. 5 illustrates the excellent agreement achievable between standard FFP measurement technique and the simultaneous bi-directional OTDR measurement method of the invention at 1300nm and 1550nm. The repeatability of the MFD measurement was measured to have one standard deviation of $\sigma = 0.1$um or less at both wavelengths.

Equations For Removing Reflectivity From Reverse Trace T2

The logarithmic equations for correcting reverse trace T2 are complex from a mathematical standpoint, but they are set forth below in a step-by-step fashion to provide a more complete understanding of the novel method of the invention. I. The signal is received by the detector at time t:

Case 1     $0 < t < 2*L/Vg$     (Forward trace T1 only)

Equation 1:
$$P(t) = E_o\, Vg\, e^{-2\alpha Tz}\, B(z)$$

Case 2     $2*L/Vg < t < 4*L/Vg$     (T2 contaminated reverse signal)

Equation 2:
$$P(t) = E_o\, Vg\, e^{-2\alpha TL}\, [e^{-2\alpha TZ'}\, Re^2 B(Z') + 2e^{-2\alpha TZ}\, ReRi\, B(Z)]$$

$$P(t) = E_o\, Vg\, e^{-2\alpha TL}\, Re^2 \left[ e^{-2\alpha TZ'}\, B(Z') + 2e^{-2\alpha TZ}\, B(Z)\, \frac{Ri}{Re} \right]$$

Case 3     $4*L/Vg < t < 6*L/Vg$     (T2 contaminated reverse signal)

Equation 3:

-continued $$P(t) = E_o Vg\, e^{-4\alpha TL} [e^{-2\alpha TZ'} 2Re^3 Ri\, B(Z') + 3e^{-2\alpha TZ} Re^2 Ri^2 B(Z)]$$

$$P(t) = E_o Vg\, e^{-4\alpha TL} Re^2 Ri \left[ e^{-2\alpha TZ'} B(Z') + e^{-2\alpha TZ} B(Z) \frac{Ri}{Re} \right]$$

The desired reverse trace is found as the primary signal of Case 2:

$$P(t)_{reverse} = E_o Vg\, [^{-2\alpha_T L} Re^2] e^{-2\alpha_t Z'} B(Z')$$
Equation 4

Therefore, we need a method to determine the signal:

$$E_o Vg\, [2e^{-2\alpha TL} ReRi] e^{-2\alpha TZ} B(Z)$$

(Note that this is the forward trace T1 (Case 1) attenuated by a factor $2e^{-2\alpha TL} ReRi$.)

II. Determination of attenuation factor $2e^{-2\alpha TL} ReRi$.

(a) Let D0 be the signal drop from the beginning of the OTDR trace (t=0, Z=0) to the beginning of the first reflected trace ($t = 2*L/Vg + \Delta t$, $Z' \simeq L$, $Z \simeq 0$)

(b) Let D1 be the signal drop between the end of the forward OTDR trace ($t = 2*L/Vg - \Delta t$, $Z = L$) and the beginning of the first reflected trace ($t = 2*L/Vg + \Delta t$, $Z' \simeq L$, $Z \simeq 0$)

(c) Let D2 be the signal drop between the end of the first reflected trace ($t = 4*L/Vg - \Delta T$, $Z' \simeq 0, Z \simeq L$) and the beginning of the first reflected trace ($t = 4*L/Vg + \Delta t$, $Z' \simeq L, Z \simeq 0$).

$$D0 = 2\alpha_T(dB) - 10\text{Log}\, Re^2 - 10\text{Log}\frac{B(L)}{B(O)} - 10\text{Log}\left[1 + 2\frac{BO}{BL}\frac{Ri}{Re}\right]$$

$$D1 = -10\text{Log}\, Re^2 - 10\text{Log}\left[1 + 2\frac{B(O)}{B(L)}\frac{Ri}{Re}\right]$$

$$D2 = -10\text{Log}2ReRi + 10\text{Log}\frac{B(O)}{B(L)} + 10\text{Log}\frac{\left[1 + 2\frac{B(L)}{B(O)}\frac{Ri}{Re}\right]}{\left[1 + \frac{3}{2}\frac{B(O)}{B(L)}\frac{Ri}{Re}\right]}$$

D0, D1, D2 are measured directly from the OTDR trace, in dB. Then:

$$-[D0 + (D2 - D1)] = -2\alpha_{T(dB)} + 10\text{Log}2ReRi + E$$

Note: Recognize that $10\text{Log}[e^{-2\alpha TL} ReRi] = [-2\alpha_t + 10\text{Log}2ReRi]$. *This allows for subtraction of the attenuated forward trace from the measured reflected trace.* E represents a small error as follows:

$$E = 10\text{Log}\left[\frac{B(L)}{B(O)}\right]^2 + 10\text{Log}\frac{\left[1 + 2\frac{B(L)}{B(O)}\frac{Ri}{Re}\right]}{\left[1 + \frac{3}{2}\frac{B(O)}{B(L)}\frac{Ri}{Re}\right]}$$

III. To minimize error E:
(a) Set B(L)=B(O) in the system. Then:

$$E = 10\text{Log}\frac{\left[1 + 2\frac{Ri}{Re}\right]}{\left[1 + \frac{3}{2}\frac{Ri}{Re}\right]} << 1$$

(b) Since $B(Z) \simeq K\, W(Z)^{-2}$, therefore set $$\frac{W(L)}{W(O)} = \sqrt[4]{\frac{4}{3}},$$

then $$\frac{B(L)}{B(O)}$$

is known and $E \simeq O$ for single mode fibers.

(c) Since $B(Z) = K'\, NA(Z)^2$, set $$\frac{NA(L)}{NA(O)} = \sqrt[4]{\frac{3}{4}},$$

then $$\frac{B(L)}{B(O)}$$

is known and $E \simeq O$, for multi-mode fibers.

The legend for the variable designations set forth above is as follows:
L: Length of fiber from OTDR input to mirror
Vg: Group velocity (Constant for equations set forth above)
$\alpha_T$: Total local loss component
$\alpha_T$ (dB): Total loss of span in logarithmic units
Z: Distance measured from input end
Z': Distance measured from mirror
B(Z): Scattering fraction and containment factor (fiber location dependent)
Re: Mirror reflectivity
Ri: Reflectivity at OTDR/fiber interface
W: Mode field radius (single mode fiber characteristic)
NA: Numerical aperture (multi-mode fiber characteristics)

IV. Measurement in case of very long test fibers:
Use of the correction method described above requires the ability to measure D2. Depending on length L and the OTDR apparatus used, this may not always be possible to do (e.g., we may not be able to measure and correct in the same measurement).

To solve this problem, we can determine 10Log2-ReRi in advance by measuring a link with only launch and termination fibers first, calculating 10Log2ReRi and using this information to correct the longer span after measurement. This may be important, especially for field applications.

It will be understood that various details of the invention may be changed without departing from the scope of the invention. Furthermore, the foregoing description is for the purpose of illustration only, and not for the purpose of limitation-the invention being defined by the claims.

What is claimed is:

1. A simultaneous bi-directional testing method for measuring certain characteristics of an optical fiber by Optical Time Domain Reflectometry (OTDR) comprising the steps of:
    splicing a test fiber between a launch fiber and a termination fiber, said launch fiber being operatively connected to an Optical Time Domain Reflectometry (OTDR) testing apparatus and said termination fiber being provided with a reflective coating at its terminal end;
    introducing a light pulse into said launch fiber with said Optical Time Domain Reflectometry (OTDR) testing apparatus;
    detecting the forward trace signal (T1) and the reverse trace signal (T2) from said light pulse;
    correcting the reverse trace signal (T2) from said light pulse to remove reflected signals originating at the interface of said Optical Time Domain Reflectometry (OTDR) testing apparatus and said launch fiber; and
    analyzing the forward trace signal (T1) and the corrected reverse trace signal (T2) to measure certain characteristics of said test fiber.

2. A simultaneous bi-directional testing method according to claim 1 wherein said launch fiber and said termination fiber each have a minimum length of 200 meters.

3. A simultaneous bi-directional testing method according to claim 1 wherein the reflective coating at the terminal end of said termination fiber is a connectored fiber with a gold coated end.

4. A simultaneous bi-directional testing method according to claim 3 wherein the reflectivity of said gold reflective coating at the terminal end of said termination fiber is at least 90%.

5. A simultaneous bi-directional testing method according to claim 1 wherein said test fiber is a single mode optical fiber.

6. A simultaneous bi-directional testing method according to claim 1 wherein said test fiber is a multi-mode optical fiber.

7. A simultaneous bi-directional testing method according to claim 5 wherein the characteristics of said single mode optical fiber measured comprise single mode fiber attenuation, splice loss and mode field diameter.

8. A simultaneous bi-directional testing method according to claim 6 wherein the characteristics of said multi-mode optical fiber measured comprise fiber attenuation, splice loss and numerical aperture.

9. A simultaneous bi-directional testing method according to claim 1 wherein said light pulse introduced into said launch fiber is a laser pulse.

10. A simultaneous bi-directional testing method according to claim 1 wherein the forward trace signal (T1) an the reverse trace signal (T2) are detected by an optical detector.

11. A simultaneous bi-directional testing method according to claim 10 wherein the forward trace signal (T1) and the reverse trace signal (T2) are displayed on an oscilloscope.

12. A simultaneous bi-directional testing method according to claim 1 including further correcting the reverse trace signal (T2) by removing reflected signals originating from within said Optical Time Domain Reflectometry (OTDR) testing apparatus.

13. A simultaneous bi-directional testing method according to claim 1 wherein an algorithm is used to correct the reverse trace signal (T2).

14. A simultaneous bi-directional testing method according to claim 13 wherein a computer is used to correct the reverse trace signal (T2) and to analyze the forward trace signal (T1) and the corrected reverse trace signal (T2).

15. A simultaneous bi-directional testing method for measuring certain characteristics of an optical fiber by Optical Time Domain Reflectometry (OTDR) comprising the steps of:
    splicing a test fiber between a launch fiber and a termination fiber, said launch fiber being operatively connected to an Optical Time Domain Reflectometry (OTDR) testing apparatus and said termination fiber being provided with a reflective coating at its terminal end;
    introducing a laser light pulse into said launch fiber with said Optical Time Domain Reflectometry (OTDR) testing apparatus;
    detecting the forward trace signal (T1) and the reverse trace signal (T2) from said laser light pulse with an optical detector;
    correcting the reverse trace signal (T2) from said light pulse to remove reflected signals originating from within said Optical Time Domain Reflectometry (OTDR) testing apparatus and originating at the interface of said Optical Time Domain Reflectometry (OTDR) testing apparatus and said launch fiber; and
    analyzing the forward trace signal (T1) and the corrected reverse trace signal (T2) to measure certain characteristics of said test fiber.

16. A simultaneous bi-directional testing method according to claim 15 wherein said launch fiber and said termination fiber each have a minimum length of 200 meters.

17. A simultaneous bi-directional testing method according to claim 15 wherein the reflective coating at the terminal end of said termination fiber is a connectored fiber with a gold coated end.

18. A simultaneous bi-directional testing method according to claim 17 wherein the reflectivity of said gold reflective coating is at least 90%.

19. A simultaneous bi-directional testing method according to claim 15 wherein said test fiber is a single mode optical fiber.

20. A simultaneous bi-directional testing method according to claim 15 wherein said test fiber is a multi-mode optical fiber.

21. A simultaneous bi-directional testing method according to claim 19 wherein the characteristics of said single mode optical fiber measured comprise single mode fiber attenuation, splice loss and mode field diameter.

22. A simultaneous bi-directional testing method according to claim 20 wherein the characteristics of said multi-mode optical fiber measured comprise fiber attenuation, splice loss and numerical aperture.

23. A simultaneous bi-directional testing method according to claim 15 wherein an algorithm is used to correct the reverse trace signal (T2).

24. A simultaneous bi-directional testing method according to claim 23 wherein a computer is used to correct the reverse trace signal (T2) and to analyze the forward trace signal (T1) and the corrected reverse trace signal (T2).

25. A simultaneous bi-directional testing method according to claim 15 wherein said launch fiber and said termination fiber are each selected so that the scattering containment factor at the input end of said launch fiber is equivalent to the scattering containment factor at the terminal end of said termination fiber.

26. A simultaneous bi-directional testing method according to claim 15 wherein the mode field diameter at the input end of said launch fiber W(O) is related to the mode field diameter at the terminal end of said termination fiber W(L) according to the following equation:

$$\frac{W(L)}{W(O)} = \sqrt[4]{\frac{4}{3}}$$

wherein said optical fiber is a single mode fiber.

27. A simultaneous bi-directional testing method according to claim 15 wherein the numerical aperture at the input end of said launch fiber NA(L) is related to the numerical aperture at the terminal end of said termination fiber NA(O) according to the following equation:

$$\frac{NA(L)}{NA(O)} = \sqrt[4]{\frac{3}{4}}$$

wherein said optical fiber is a multi-mode fiber.

* * * * *